3,481,758
METHOD OF COATING A GLASS SUBSTRATE
Lee O. Upton, Sturbridge, Mass., assignor, by mesne assignments, to American Optical Corporation, a corporation of Delaware
No Drawing. Filed Nov. 1, 1966, Ser. No. 591,137
Int. Cl. C03c 17/00; B29d 11/00
U.S. Cl. 117—33.3    4 Claims

ABSTRACT OF THE DISCLOSURE

Ultra-violet and infra-red absorbents are dissolved in an aluminum metaphosphate frit for dissolution in an organic resinate vehicle. The above coating is then applied to a lens surface and fired in an oxidizing atmosphere so that the solvents of the organic materials are evaporated and the organic materials oxidized leaving a vitreous coating for the lens with a capability for absorbing rays in the ultra-violet and infra-red regions of the wavelength spectrum. Various colors for the coating can be obtained by the use of various absorbents in the aluminum metaphosphate frit.

---

This invention relates primarily to coated lenses and more particularly to lens coating materials comprising ultra-violet and infra-red absorbent materials.

Presently, ultra-violet and infra-red absorbing materials are incorporated in the glass lens itself which provides less flexibility for the producer in stocking various colors of glass lenses. Furthermore, by coloring or providing the absorbing capability in the lens material itself, the lens material becomes more difficult to handle and melt, especially since the absorbents usually increase the melting temperature for the silicate base.

Accordingly, a primary object of the present invention is to provide a coating for a glass lens which is capable of absorbing ultra-violet and infra-red rays.

This object and others are accomplished in one illustrative embodiment of the present invention wherein the infra-red and ultra-violet absorbent or absorbents are dissolved in aluminum metaphosphate glass and a frit produced for dissolution in an organic resinate vehicle. The resulting coating is applied to a glass lens.

Other objects, features, and embodiments of the present invention are contemplated and will be apparent by reference to the following more detailed description, wherein:

As an example of the present invention, $Fe_2O_3$ is dissolved in an aluminum metaphosphate $[Al(PO_3)_3]$ melt and a frit produced. The frit is then dissolved in a resinate, such as a resinate of a base metal. Examples of the base metal resinates are iron, titanium, bismuth, and tin, with or without the addition of sulpho-resinates of gold and/or other precious metals, in organic solvents such as essential oils, aromatic alcohols, ethers, ketones, light mineral oils, volatile hydrocarbons and chlorinated hydrocarbons. The color of the coating for the lens may be varied by choice of the base material for the resinate and/or by choice of the ultra-violet and infra-red absorbents. Absorbents other than $Fe_2O_3$ that can be employed are the following: $MnO_2$, $MoO_2+CuO$, $MoO_2+CoO$, $MoO_2+CuO+CoO$. Whereas the $Fe_2O_3$ will provide a green coating, the $MnO_2$ will provide a lavender color, the $MoO_2+CuO$ will provide a bluish-green coating, the $MoO_2+CoO$ will provide a blue coating, and the $MoO_2+CuO+CoO$ will provide a greenish-blue coating.

The organics in the liquid coating resulting from the above process may be volatilized by applying the coating material to the lens and heating in an oxidizing atmosphere to between 508 and 750° Fahrenheit or more (up to approximately 1100° Fahrenheit) for 15 minutes to one hour (depending on the firing temperature). In this way the organic materials of the coating are evaporated and oxidized leaving a residue composed of absorbents in a vitreous coating upon the lens substrate. It is recommended that up to 10 weight percent of the absorbent may be provided in the aluminum metaphosphate melt with 5 weight percent being a preferred composition.

It is understood that the resinate may be any salt or ester of a resin acid such as a salt or ester of colophonic acid ($C_{20}H_{30}O_2$).

I claim:
1. A method of coating a glass substrate with an ultraviolet and infrared absorbing coating comprising the steps of:
   (a) dissolving infrared and ultraviolet absorbing base metal oxides in an aluminum metaphosphate glass melt,
   (b) forming a frit from said aluminum metaphosphate glass containing said ultraviolet and infrared absorbing base metal oxides,
   (c) dissolving said frit in a resinate to form a coating material,
   (d) applying said coating material to the glass substrate, and
   (e) heating said glass substrate with said coating material applied thereto to a temperature between the range of approximately 500° F. and 1100° F.

2. The method as set forth in claim 1 wherein said ultraviolet and infrared absorbing metal oxides are selected from a member of the group consisting of:
   (a) $Fe_2O_3$
   (b) $MnO_2$
   (c) $MoO_2$ and $CuO$
   (d) $MoO_2$ and $CoO$, and
   (e) $MoO_2$ and $CuO$ and $CoO$.

3. The method as set forth in claim 2 wherein said resinate is a sulfo-resinate of a precious metal.

4. The method as set forth in claim 3 wherein said aluminum metaphosphate glass contains said base metal oxides within the range of approximately 5–10 weight percent.

References Cited

UNITED STATES PATENTS

| | | | |
|---|---|---|---|
| 1,570,202 | 1/1926 | Buck | 106—47 |
| 1,951,213 | 3/1934 | Schlumbohm | 117—33.3 X |
| 2,294,844 | 9/1942 | Gelstharp | 106—47 |
| 2,477,649 | 8/1949 | Pincus | 106—47 |
| 2,486,811 | 11/1949 | Weyl | 106—47 X |
| 2,808,351 | 10/1957 | Colbert et al. | 117—33.3 X |
| 2,901,379 | 8/1959 | Shannon et al. | 117—169 X |
| 2,919,201 | 12/1959 | Izumitani et al. | 106—47 |
| 2,964,427 | 12/1960 | Rheinberger et al. | 117—33.3 |
| 2,999,819 | 9/1961 | Blair | 106—47 X |
| 3,176,575 | 4/1965 | Socha | 117—33.3 X |
| 3,185,586 | 5/1965 | Saunders et al. | 117—124 X |
| 3,244,547 | 4/1966 | Orr et al. | 117—33.3 |
| 3,281,253 | 10/1966 | Weidel | 106—47 |

WILLIAM D. MARTIN, Primary Examiner

U.S. Cl. X.R.

117—124, 169